(12) United States Patent
Lai

(10) Patent No.: US 8,807,782 B2
(45) Date of Patent: Aug. 19, 2014

(54) BACKLIGHT MODULE

(75) Inventor: Chih-Chen Lai, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 148 days.

(21) Appl. No.: 13/472,455

(22) Filed: May 15, 2012

(65) Prior Publication Data

US 2013/0163286 A1 Jun. 27, 2013

(30) Foreign Application Priority Data

Dec. 27, 2011 (CN) .......................... 2011 1 0444250

(51) Int. Cl.
*F21V 21/00* (2006.01)

(52) U.S. Cl.
USPC ............... 362/217.14; 362/97.1; 362/97.2; 362/225; 362/382; 362/615

(58) Field of Classification Search
USPC ............... 362/97.1–97.3, 217.1, 217.14, 225, 362/382, 613, 615, 632–634
See application file for complete search history.

*Primary Examiner* — Meghan Dunwiddie
(74) *Attorney, Agent, or Firm* — Novak Druce Connolly Bove + Quigg LLP

(57) ABSTRACT

A backlight module includes a housing, a light emitting unit, plural supporters and a light guiding plate. The housing includes a base and a first frame and a second frame arranged on two opposite sides of the base. Each supporter includes two supporting portions placed on two opposite sides of the light emitting unit. Each supporting portion includes a supporting surface facing the light emitting unit, wherein the supporting surface is slant. A distance between two opposite supporting portions is increased along a direction from the base to a top surface of the supporter. The light guiding plate is arranged on the supporting surfaces of the supporters. The light guiding plate includes a light input surface facing to the light emitting unit and a light output surface facing the first frame.

19 Claims, 5 Drawing Sheets

BACKLIGHT MODULE

TECHNICAL FIELD

The disclosure generally relates to backlight modules, and particularly to an backlight module with an improved assembly accuracy and a high light extraction efficiency.

DESCRIPTION OF RELATED ART

A typical LCD device includes a liquid crystal display panel, and a backlight module mounted behind the liquid crystal display panel. The backlight module mainly includes a light source and a light guiding plate. The light guiding plate is generally made of a transparent acrylic plastic, and is used for guiding light emitted by the light source in order to uniformly illuminate the liquid crystal display panel.

Generally, a backlight module includes two frames, a light guiding plate received between the frames, and a light emitting unit located at a side (e.g. bottom side) of the light guiding plate. A distance between the frames is larger than a thickness of the light guiding plate, to thereby provide a tolerance for accommodating a variation of a thickness of the light guiding plate. However, the light guiding plate is easily to shift from its exact alignment with the light emitting unit when arranging the light guiding plate between the frames due to the tolerance provided between the frames; therefore, light emitted from the light emitting unit is not completely emitted into the light guiding plate. As a result, the light extraction efficiency of the backlight module is lower than intended because a part of the light from the light emitting unit is lost without entering the light guide plate.

Thus, it is desired to provide a backlight module which can overcome the described limitations.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Embodiments of the backlight module will now be described in detail below and with reference to the drawings.

Figure 1:
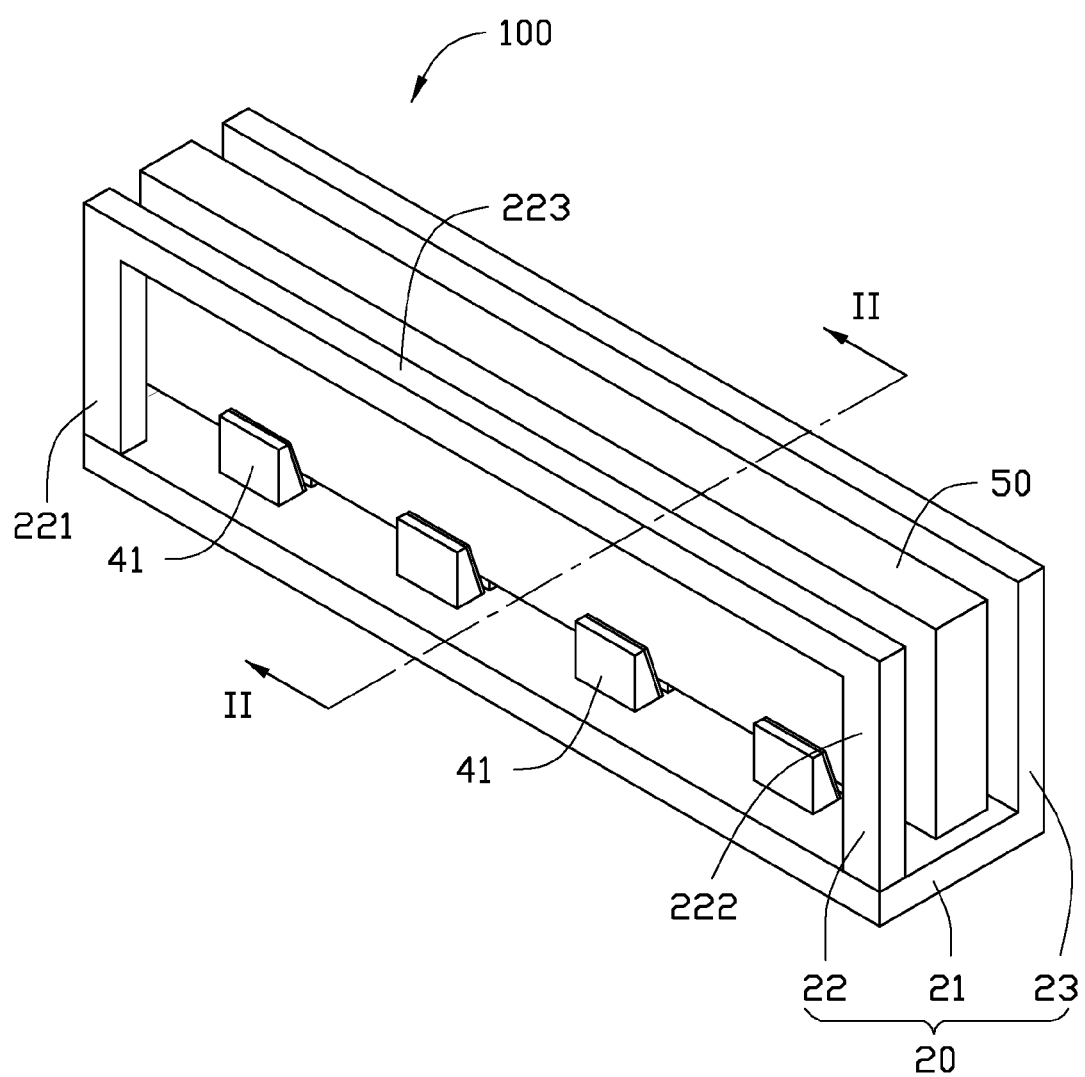
FIG. 1 is an assembled, isometric view of a backlight module, according to a first embodiment of the present disclosure.
Figure 2:
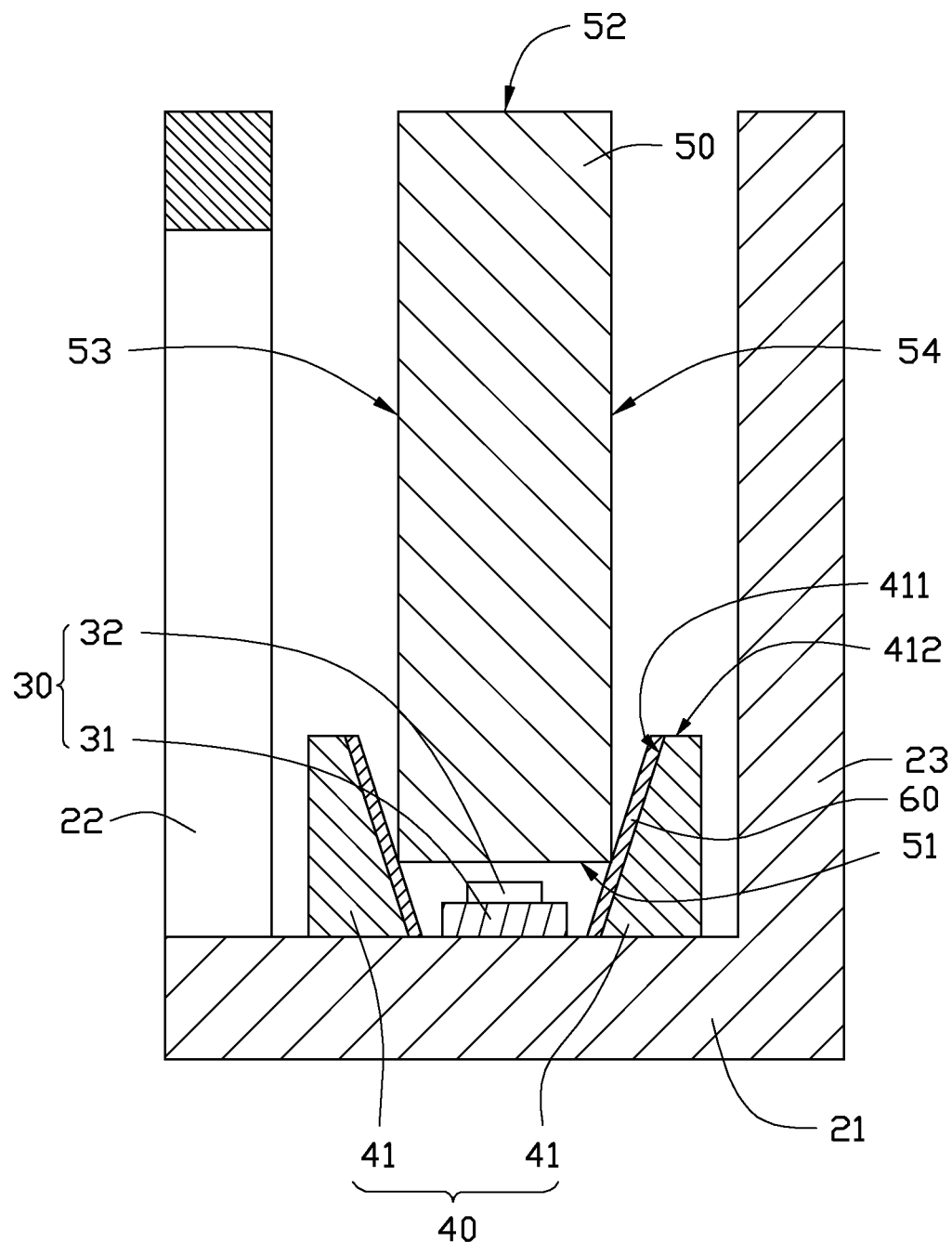
FIG. 2 is a cross-sectional view of the backlight module of FIG. 1, taken along line II-II thereof.

Referring to FIG. 1 and FIG. 2, a backlight module 100 in accordance with a first embodiment is shown. The backlight module 100 includes a housing 20, a light emitting unit 30, a plurality of supporters 40 and a light guiding plate 50.

The housing 20 includes a base 21, and a first frame 22 and a second frame 23 extending perpendicularly and upwardly from two opposite sides of the base 21, respectively. The first frame 22 is hollow and includes a first pole 221, a second pole 222, and a third pole 223 interconnecting a top potion of the first pole 221 and a top potion of the second pole 222. The first frame 22 is used to support a transparent plate (not shown), such as a glass plate or a plastic plate in an inner space thereof, which is surrounded by the first, second and third poles 221, 222, 223. In the present embodiment, the second frame 23 is solid and integrally formed with the base 21 as a single piece.

The light emitting unit 30 is arranged on the base 21 of the housing 20, and includes a substrate 31, and a plurality of spaced light emitting elements 32 evenly arranged on the substrate 31 along a lengthwise direction of the substrate 31. In the present embodiment, the substrate 31 is a print circuit board, the light emitting elements 32 are LEDs (light emitting diodes).

The supporters 40 are arranged on the base 21 of the housing 20. In the present embodiment, each supporter 40 corresponds to a light emitting element 32. Each supporter 40 includes two supporting portions 41 placed on two opposite sides of the corresponding light emitting element 32, respectively. Each supporting portion 41 has a supporting surface 411 facing the corresponding light emitting element 32. A cross-sectional shape of each supporting portion 41 is trapeziform. The supporting surface 411 is slant, and a distance between the two opposite supporting portions 41 gradually increases along a direction from the base 21 to top surfaces 412 of the supporters 40. In the present embodiment, the two opposite supporting portions 41 of each supporter 40 have the same shape and size, and are symmetrical to each other. The light emitting elements 32 are arranged on a center between the two corresponding supporting portions 41. The supporting portions 41 are higher than the light emitting elements 32.

The light guiding plate 50 includes a light input surface 51 facing the light emitting elements 32, an upper surface 52 opposite to the light input surface 51, a first side surface 53 and a second side surface 54 between the light input surface 51 and the upper surface 52. The first side surface 53 faces the first frame 22 of the housing 20, the second side surface 54 is opposite to the first side surface 53 and faces the second frame 23 of the housing 20. In the present embodiment, the first side surface 53 functions as light output surface of the light guiding plate 50. A thickness of the light guiding plate 50 is larger than a minimal distance between the two supporting surfaces 411.

In the present embodiment, a reflective layer 60 is coated on the supporting surface 411 of the supporting portion 41 to reflect light emitted from the light emitting elements 32. The reflective layer 60 can be made of metal with high light reflective efficiency, such as silver or aluminum.

The light guiding plate 50 is clamped by the supporting surfaces 411 of the supporters 40; therefore, it is easy to accurately assemble the light guiding plate 50 to the housing 20 including the two frames 22, 23. The light input surface 51 of the light guiding plate 50 directly faces the light emitting elements 32, a part of light emitted from the light emitting elements 32 enters the light input surface 51 of the light guiding plate 50, and another part of the light emitted from the light emitting elements 32 which does not directly enter the light guiding plate 50 is first reflected by the reflective layer 60 and then enters the light input surface 51 of the light guiding plate 50; therefore, the backlight module 100 has a high light extraction efficiency because of no light loss occurs.

Figure 3:
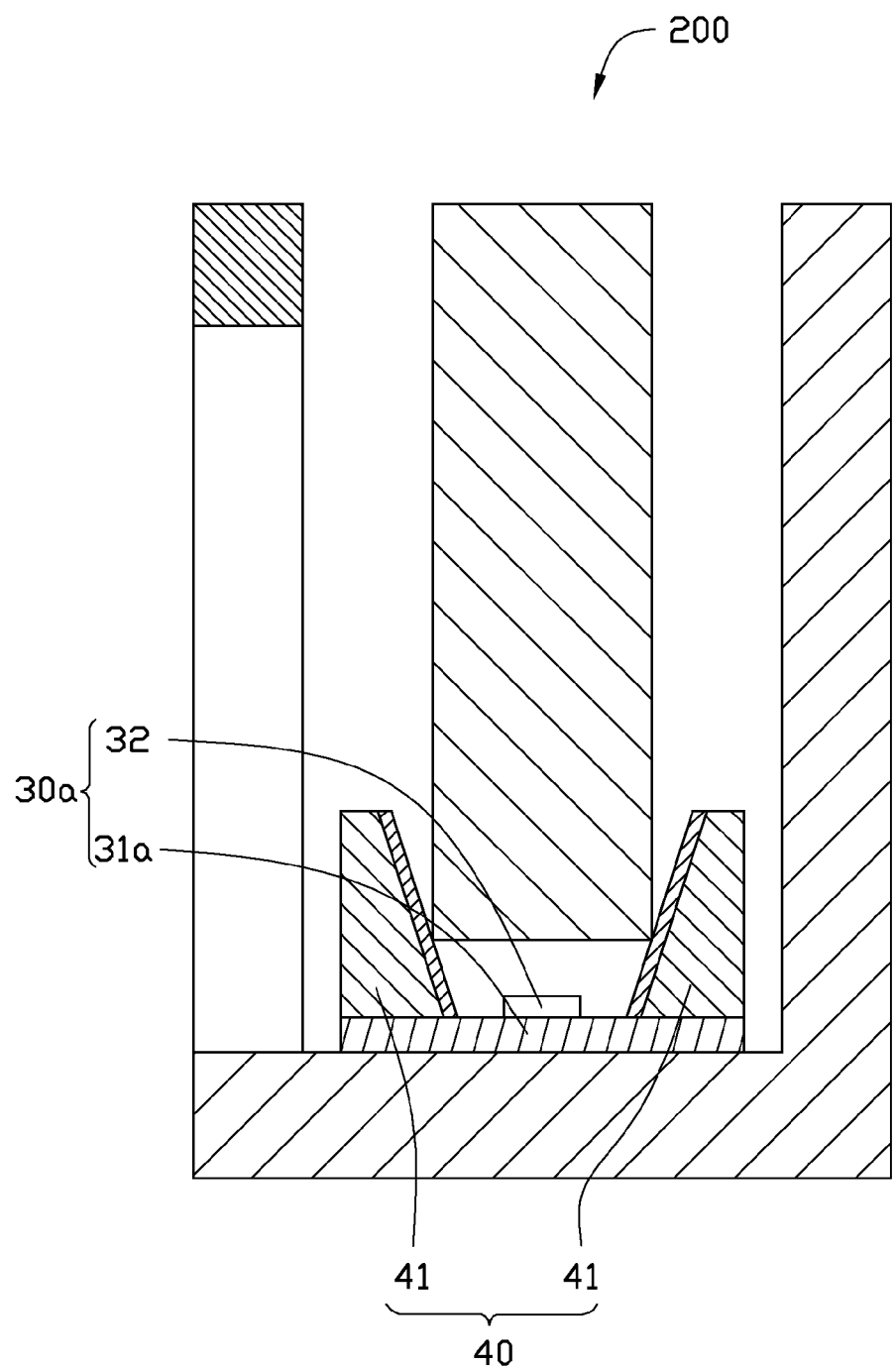
FIG. 3 is a cross-sectional view of a backlight module, according to a second embodiment of the present disclosure.

Referring to FIG. 3, a backlight module 200 according to a second embodiment is shown. Differing from the backlight module 100 of the first embodiment, the backlight module 200 has a light emitting unit 30a including a substrate 31a which has a width larger than that of the substrate 31 of the light emitting unit 30, and the supporters 40 are arranged on the substrate 31a of the light emitting unit 30a. The supporting portions 41 of each supporter 40 are placed on two opposite sides of one of the light emitting elements 32.

Figure 4:
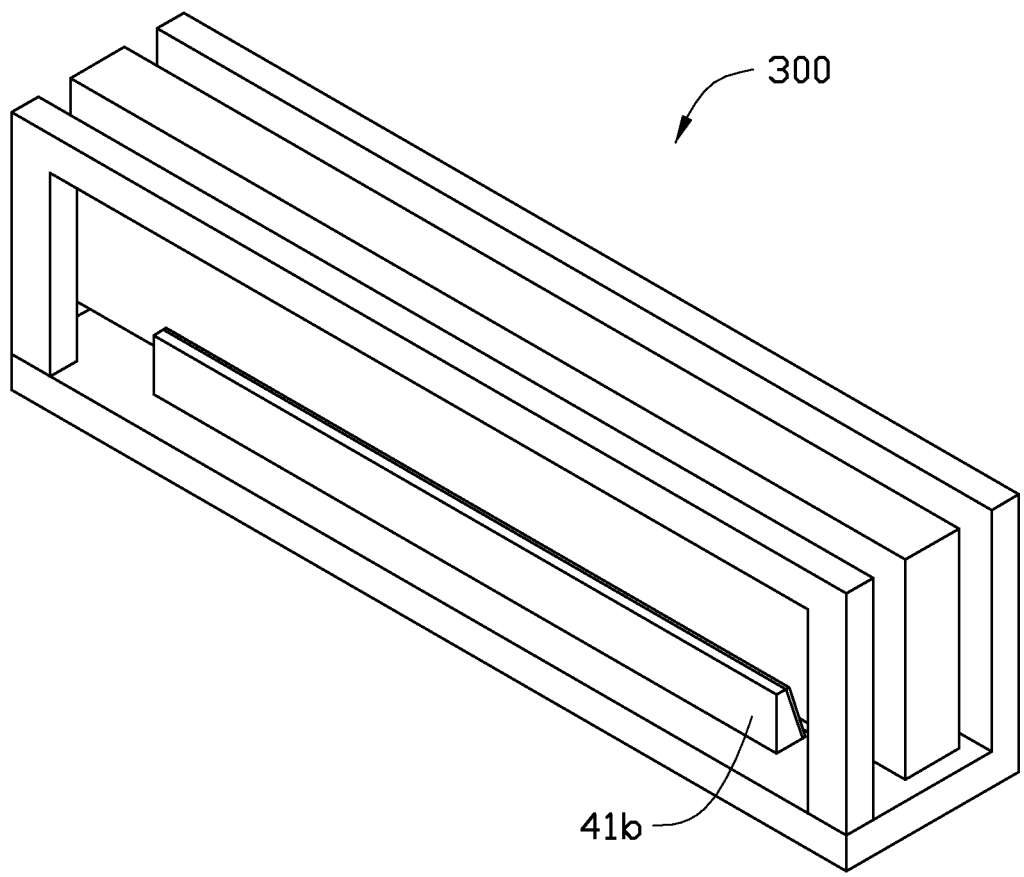
FIG. 4 is an assembled, isometric view of a backlight module, according to a third embodiment of the present disclosure.

Referring to FIG. 4, a backlight module 300 according to a third embodiment is shown. Differing from the backlight module 100 of the first embodiment, the backlight module 300 has a supporter with two supporting portion 41b between which the light emitting diodes 32 are located. Each supporting portion 41b extends along a side of the light emitting elements 32 and has a length substantially the same as that of a line formed by the light emitting elements 32. In other words, the supporting portion 41b can be deemed as extending the supporting portions 41 in the first embodiment on the same side of the light emitting elements 32 to connect with each other to be a single piece.

Figure 5:
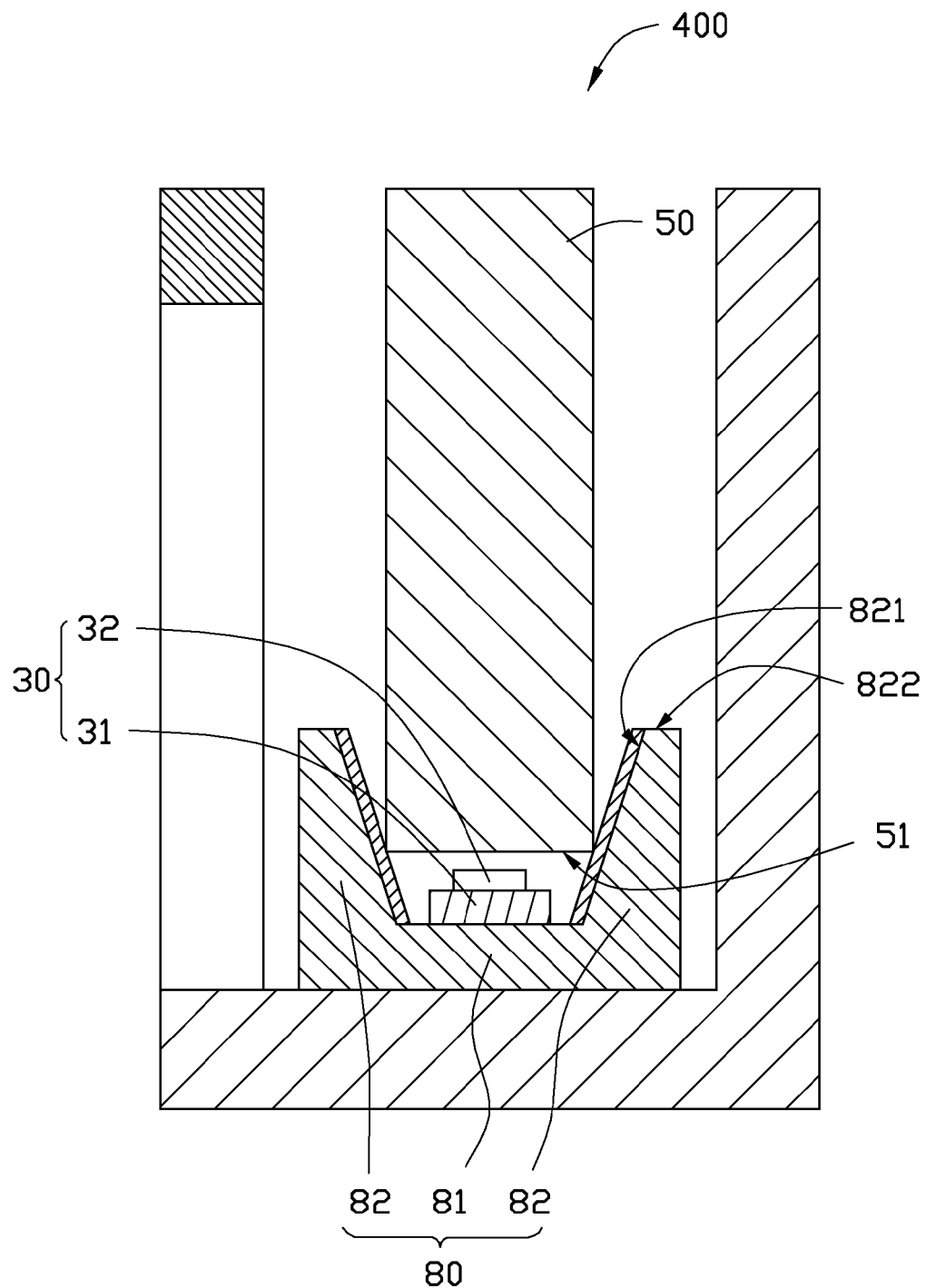
FIG. 5 is a cross-sectional view of a backlight module, according to a fourth embodiment of the present disclosure.

Referring to FIG. 5, a backlight module 400 according to a fourth embodiment is shown. Differing from the backlight module 200 of the second embodiment, the backlight module 400 includes a plurality of supporters 80. Each of the supporters 80 includes a holder 81 and two supporting portions 82 placed on two opposite sides of the holder 81. The holder 81 and the two supporting portions 82 are formed integrally as a single piece. The light emitting unit 30 is arranged on the holder 81 of the supporter 80 at a position between the two supporting portions 82. In the present embodiment, the two supporting portions 82 are symmetrical to each other. A cross-section of each supporting portion 82 is trapeziform. Each supporting portion 82 has a supporting surface 821 adjacent to the light emitting element 32. The supporting surface 821 is slant, and a distance between the two supporting surfaces 821 gradually increases along a direction from the holder 81 to a top surface 822 of the supporting portion 81. A thickness of the light guiding plate 50 is larger than a minimal distance between the two supporting surfaces 821. Alternatively, similar to the third embodiment, the supporters 80 in the fourth embodiment can be integrally form as a single supporter in a single piece, and the single supporter includes a holder and two supporting portions placed on two opposite sides of the holder.

It is to be further understood that even though numerous characteristics and advantages have been set forth in the foregoing description of embodiments, together with details of the structures and functions of the embodiments, the disclosure is illustrative only; and that changes may be made in detail, especially in matters of shape, size, and arrangement of parts within the principles of the disclosure to the full extent indicated by the broad general meaning of the terms in which the appended claims are expressed.

What is claimed is:

1. A backlight module comprising:
a housing comprising a base, and a first frame and a second frame arranged on two opposite sides of the base, respectively;
a light emitting unit arranged on the base;
a plurality of supporters arranged on the base, each supporter comprising two supporting portions respectively on two opposite sides of the light emitting unit and a top surface opposite to the base, each supporting portion comprising a supporting surface facing the light emitting unit, the supporting surface being slant, a distance between two opposite supporting portions increasing along a direction from the base to the top surfaces of the supporters; and
a light guiding plate arranged on the supporting surfaces of the supporters, the light guiding plate comprising a light input surface facing the light emitting unit and a light output surface facing one of the first and second frames.

2. The backlight module of claim 1, wherein a thickness of the light guiding plate is larger than a minimal distance between the supporting portions.

3. The backlight module of claim 1, wherein a cross-section of each supporting portion is trapeziform.

4. The backlight module of claim 1, wherein the two supporting portions of one of the supporters are symmetrical to each other.

5. The backlight module of claim 1, wherein the light emitting unit comprises a substrate and a plurality of light emitting elements arranged on the substrate.

6. The backlight module of claim 5, wherein the light emitting elements are arranged in a line on a center of the substrate along a lengthwise direction of the substrate.

7. The backlight module of claim 5, wherein the supporters are arranged on two opposite sides of the substrate.

8. The backlight module of claim 5, wherein the supporters are arranged on the substrate.

9. The backlight module of claim 5, wherein each supporter corresponds to a light emitting element.

10. The backlight module of claim 1, wherein the supporting portions arranged on the same side of the light emitting unit are integrally formed with each other as a single piece.

11. The backlight module of claim 1, wherein each supporter further comprises a holder, the two supporting portions being placed on two opposite sides of the holder, the light emitting unit being arranged on the holder and located between the two supporting portions.

12. The backlight module of claim 11, wherein the two supporting portions are integrally with the holder as a single piece.

13. The backlight module of claim 1, wherein the light output surface of the light guiding plate faces the first frame which is hollow, and the first frame is configured for supporting a transparent plate.

14. A backlight module comprising:
a housing comprising a base, and a first frame and a second frame arranged on two opposite sides of the base, respectively;
a light emitting unit arranged on the base;
a plurality of supporters arranged on the base, each supporter comprising two supporting portions respectively on two opposite sides of the light emitting unit, a distance between two opposite supporting portions being increased along a direction from the base to a top surface of each supporter; and
a light guiding plate supported by the supporting portions, a thickness of the light guiding plate being larger than a minimal distance between the supporting portions, the light guiding plate comprising a light input surface facing the light emitting unit and a light output surface facing one of the first and second frames.

15. The backlight module of claim 14, wherein each supporting portion comprises a supporting surface facing the light emitting unit, the supporting surface being slant.

16. The backlight module of claim 14, wherein the light emitting unit comprises a substrate and a plurality of light emitting elements arranged on the substrate.

17. The backlight module of claim 16, wherein the supporters are arranged on two opposite sides of the substrate.

18. The backlight module of claim 16, wherein the supporters are arranged on the substrate.

19. The backlight module of claim 14, wherein each supporter further comprises a holder, the two supporting portions being placed on two opposite sides of the holder, the light emitting unit being arranged on the holder and located between the two supporting portions.

* * * * *